United States Patent
Kim et al.

(10) Patent No.: US 9,490,675 B2
(45) Date of Patent: Nov. 8, 2016

(54) STATOR OF MOTOR HAVING INSULATION STRUCTURE FOR SEPARATION OF STATOR WINDING GROUPS

(75) Inventors: Hyunseop Kim, Seoul (KR); Byungyong Kim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 365 days.

(21) Appl. No.: 13/552,283

(22) Filed: Jul. 18, 2012

(65) Prior Publication Data

US 2013/0043743 A1 Feb. 21, 2013

(30) Foreign Application Priority Data

Aug. 16, 2011 (KR) .................. 10-2011-0081030
Aug. 16, 2011 (KR) .................. 10-2011-0081033
Aug. 16, 2011 (KR) .................. 10-2011-0081039
Aug. 25, 2011 (KR) .................. 10-2011-0085339

(51) Int. Cl.
*H02K 3/34* (2006.01)
*H02K 3/32* (2006.01)

(52) U.S. Cl.
CPC ......... *H02K 3/34* (2013.01); *H02K 3/32* (2013.01); *H02K 3/325* (2013.01); *H02K 3/345* (2013.01)

(58) Field of Classification Search
CPC .......... H02K 3/32; H02K 3/325; H02K 3/34; H02K 3/345; H02K 1/04
USPC ............................ 310/43, 214, 215, 260, 270
See application file for complete search history.

(56) References Cited

U.S. PATENT DOCUMENTS

| | | | | |
|---|---|---|---|---|
| 5,969,455 A * | 10/1999 | Sakamoto | .................. | 310/194 |
| 6,870,292 B2 * | 3/2005 | Owada et al. | ................ | 310/194 |
| 7,489,061 B2 * | 2/2009 | Nishimura | ............. | H02K 1/148 |
| | | | | 310/215 |
| 7,626,304 B2 * | 12/2009 | Morioka et al. | ........ | 310/216.004 |
| 7,649,295 B2 * | 1/2010 | Fukui et al. | .................. | 310/215 |
| 8,008,831 B2 * | 8/2011 | Takeshita et al. | ............. | 310/214 |
| 8,013,490 B2 * | 9/2011 | Hino | ........................ | H02K 3/34 |
| | | | | 310/194 |
| 8,035,268 B2 * | 10/2011 | Okuyama et al. | ............ | 310/215 |
| 8,907,541 B2 * | 12/2014 | Carpenter | .............. | H02K 3/345 |
| | | | | 310/215 |
| 2009/0102311 A1 * | 4/2009 | Kotani et al. | .................. | 310/215 |
| 2009/0324435 A1 * | 12/2009 | Sears et al. | ................ | 417/423.7 |
| 2010/0264774 A1 * | 10/2010 | Tokunaga | .............. | H02K 3/522 |
| | | | | 310/215 |

(Continued)

FOREIGN PATENT DOCUMENTS

CN 101164218 A 4/2008
JP H09219959 A 8/1997

(Continued)

OTHER PUBLICATIONS

Ozeki, English Translation of Method of Manufacutring Stator, and Motor Using Its Stator, Feb. 28, 2003.*

(Continued)

*Primary Examiner* — Terrance Kenerly
*Assistant Examiner* — Rashad Johnson
(74) *Attorney, Agent, or Firm* — Saliwanchik, Lloyd & Eisenschenk

(57) ABSTRACT

Disclosed is a stator of an EPS motor, the stator including a stator core including a plurality of teeth protrusively formed toward a center of an inner circumferential surface, a plurality of coils wound on the teeth at a predetermined counts, an insulator coupled to an upper surface and a bottom surface of the stator core to insulate the coil from the stator core, and an insulation tube situated nearest to a coil wound on an adjacent stator core and inserted into a coil wound on an outmost side of the teeth.

8 Claims, 10 Drawing Sheets

(56) References Cited

U.S. PATENT DOCUMENTS

| | | | |
|---|---|---|---|
| 2011/0273053 A1* | 11/2011 | Oka | H02K 3/522 310/215 |
| 2012/0075049 A1* | 3/2012 | Horng | H02K 3/34 336/198 |
| 2012/0169173 A1* | 7/2012 | Jang | H02K 3/522 310/215 |
| 2012/0187797 A1* | 7/2012 | Van Tiem et al. | 310/215 |
| 2012/0286619 A1* | 11/2012 | Tsuiki et al. | 310/215 |
| 2013/0140936 A1* | 6/2013 | Lin | H02K 3/522 310/215 |
| 2013/0221770 A1* | 8/2013 | Yokogawa | H02K 1/148 310/43 |

FOREIGN PATENT DOCUMENTS

| | | | |
|---|---|---|---|
| JP | 2003061286 A | * | 2/2003 |
| JP | 2011015480 A | | 1/2011 |

OTHER PUBLICATIONS

Office Action dated Dec. 1, 2015 in Chinese Application No. 201210293181.2.

* cited by examiner

STATOR OF MOTOR HAVING INSULATION STRUCTURE FOR SEPARATION OF STATOR WINDING GROUPS

CROSS-REFERENCE TO RELATED APPLICATIONS

This application claims the benefit under 35 U.S.C. §119 of Korean Patent Application Nos. 10-2011-0081030, filed Aug. 16, 2011, 10-2011-0081033, filed Aug. 16, 2011, 10-2011-0081039, filed Aug. 16, 2011 and 10-2011-0085339, filed Aug. 25, 2011, which are hereby incorporated by reference in their entirety.

BACKGROUND

1. Field of the Invention

The present disclosure relates to a stator of a motor.

2. Discussion of the Related Art

Generally, almost every vehicle employs an electric power-assist steering system. Such an electric power-assist steering system generates an assist force based on the steering torque and the steering angle, so as to enhance the steering performance of the vehicle.

That is, a steering system that assists a steering force of a vehicle with a separate power is used to enhance the motion stability of a vehicle.

Conventionally, the auxiliary steering device uses hydraulic pressure, but an Electronic Power Steering (EPS) system adapted to transmit a rotation output of an electric motor to a steering shaft via a speed reduction mechanism has been increasingly employed these days from a viewpoint of a reduction in engine load, a reduction in weight, an enhanced steering stability and a quick restoring force.

The EPS system is such that an Electronic Control Unit (ECU) drives a motor in response to steering conditions detected by a speed sensor, a torque angle sensor and a torque sensor to enhance a steering stability and provide a quick restoring force, whereby a driver can safely steer a vehicle.

The EPS system is also such that a motor assists a torque manipulating a steering wheel to allow a driver to steer a vehicle with less power, where the motor employs a Brushless Direct Current (BLDC) motor.

The BLDC motors have been increasingly used because the brushless motors are excellent in maintenance property, have a small size, and are capable of generating a high torque. The BLDC motor generally forms an exterior look by coupling of a housing and a cover member, an inner circumferential surface of the housing is provided with a stator, and the stator is centrally formed with a rotor rotatably mounted in electrical interaction with the stator. The rotor is rotatably supported by a rotation shaft, and an upper surface of the rotation shaft is connected by a steering shaft of a vehicle to provide a power assisting the steering of the vehicle as mentioned above.

Meanwhile, a coil wound on teeth of split cores forming a stator core is very tightly arranged, such that winding of coils needs a considerably meticulous engineering process lest a short-circuit be generated that is caused by close-contact among the coils wound on each tooth. However, there may occur a problem of generating a defect on the product due to failure by an operator in the process of assembly because a distance between coils wound on the teeth is too close or tight.

It is, therefore, desirable to overcome the above problems and others by providing an improved stator of a motor.

BRIEF SUMMARY

This section provides a general summary of the disclosure, and is not a comprehensive disclosure of its full scope or all of its features.

The present disclosure is directed to cope with the above-mentioned problems/disadvantages and it is an object of the present disclosure to provide a stator of a motor improved in an insulation structure among coils to inhibit short-circuit caused by interference among coils wound on teeth of adjacent split cores from occurring.

Technical problems to be solved by the present disclosure are not restricted to the abovementioned description, and any other technical problems not mentioned so far will be clearly appreciated from the following description by the skilled in the art.

In a general aspect of the present disclosure, there is provided a stator of an EPS motor, the stator comprising: a stator core including a plurality of teeth protrusively formed toward a center of an inner circumferential surface; a plurality of coils wound on the teeth at a predetermined counts; an insulator coupled to an upper surface and a bottom surface of the stator core to insulate the coil from the stator core; and an insulation tube situated nearest to a coil wound on an adjacent stator core and inserted into a coil wound on an outmost side of the teeth Preferably, but not necessarily, the insulation tube has a thickness smaller than a gap among the plurality of coils wound on the stator core.

Preferably, but not necessarily, the insulation tube has a length corresponding to a length of a surface opposite to an adjacent coil of the stator core.

Preferably, but not necessarily, the insulation tube is provided with a synthetic resin material having a diameter corresponding to a diameter of the coil.

Preferably, but not necessarily, one insulation tube is inserted into each coil wound on the teeth.

In another general aspect of the present disclosure, there is provided a stator of an EPS motor, the stator comprising: a stator core including a plurality of teeth protrusively formed toward a center of an inner circumferential surface; a plurality of coils wound on the teeth at a predetermined counts; an insulator coupled to an upper surface and a bottom surface of the stator core to insulate the coil from the stator core; and an insulation plate extensively formed from any one lateral wall surface of the insulator to inhibit the plurality of adjacent coils from being short-circuited.

Preferably, but not necessarily, the stator core forms a circular shape coupled by a plurality of split cores each having a tooth, and the insulator includes upper and bottom insulators provided in a symmetrical structure in a shape corresponding to that of the split core to wrap the teeth and an inner circumferential surface of the split core from upper and bottom sides.

Preferably, but not necessarily, the upper and bottom insulators include an insulator body wound on a periphery of the coil and having a tooth groove at an inner surface into which the teeth are inserted, and a guide plate protrusively formed from the insulator body at a predetermined height to inhibit the coil wound on the insulator body from being disengaged.

Preferably, but not necessarily, the insulation plate has a thickness smaller than a gap among the plurality of coils wound on the stator core.

Preferably, but not necessarily, the insulation plate has a length corresponding to a length of the insulator body wound by the coil.

Preferably, but not necessarily, the insulation plate is injection-molded along with the insulator in the same resin material as that of the insulator.

Preferably, but not necessarily, the insulation plate is rotatably formed at a lateral wall of the insulator.

In still another general aspect of the present disclosure, there is provided a stator of an EPS motor, the stator comprising: a stator core including a plurality of teeth protrusively formed toward a center of an inner circumferential surface; a plurality of coils wound on the teeth at a predetermined counts; a bus bar coupled to an upper surface of the stator core to be conductibly connected to the coil; and an insulation plate extensively formed from a bottom surface of the bus bar to be inserted into a space unit formed by the plurality of coils when the stator core and the bus bar are coupled, to inhibit adjacent coils from being short-circuited.

Preferably, but not necessarily, the insulation plate has a thickness smaller than a gap among the plurality of coils wound on the stator core.

Preferably, but not necessarily, the insulation plate has a length corresponding to a length of the stator core.

Preferably, but not necessarily, the insulation plate is injection-molded along with the bus bar in the same resin material as that of the bus bar.

Preferably, but not necessarily, the insulation plates is provided in the number corresponding to that of the coils wound on the stator core.

In still another general aspect of the present disclosure, there is provided a stator of an EPS motor, the stator comprising: a stator coil coupled to a cylindrically shaped motor housing; a plurality of coils wound on an inner side of the stator core; and an insulation paper so arranged as to wrap an outside of the plurality of coils, wherein the insulation paper is bent in the shape of a '⌐' to be inserted into a bottom lateral surface of the stator core opposite to a floor surface of the motor housing.

Preferably, but not necessarily, the insulation paper wraps an exterior of a portion of the plurality of coils.

Preferably, but not necessarily, a coil adjacent to a coil wrapped by the insulation paper is not arranged with the insulation paper.

Preferably, but not necessarily, the portion wrapped by the insulation paper is brought into contact with a floor surface of the motor housing.

Preferably, but not necessarily, both distal ends of the insulation paper face toward an opened surface side of the motor housing.

The stator of an EPS motor according to the present disclosure has an advantageous effect in that an erroneous operation such as motor short-circuit caused by coil interference can be inhibited, because interference among coils wound on teeth of split core is ruled out by insulation plate.

Another advantage is that a bus bar is integrally provided with an insulation plate to rule out interference among wound coils the moment the bus bar and a stator core are assembled to dispense with a separate insulation process including a separate winding of coils on the insulation plate.

Still another advantage is that the insulation paper is bent in the shape of a '⌐' to face a floor surface of a motor housing into which a stator core is insertedly coupled, whereby a separate disengagement device is dispensed with.

BRIEF DESCRIPTION OF THE DRAWINGS

The accompanying drawings, which are included to provide a further understanding of the present disclosure and are incorporated in the present disclosure and constitute a part of this application, and together with the description, serve to explain the principle of the disclosure. In the drawings.

DETAILED DESCRIPTION

Figure 1:
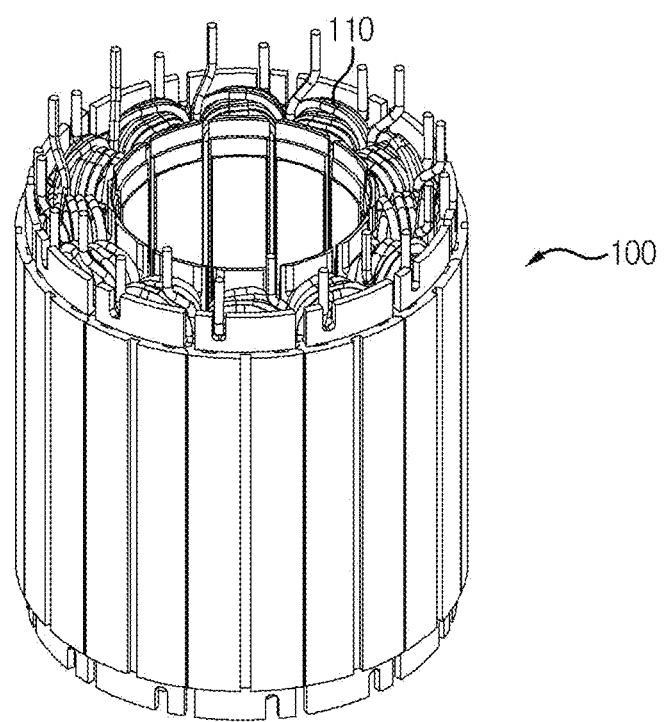
FIG. 1 is a schematic perspective view of a stator core according to an exemplary embodiment of the present disclosure.

Advantages and features of the present invention may be understood more readily by reference to the following detailed description of exemplary embodiments and the accompanying drawings. Detailed descriptions of well-known functions, configurations or constructions are omitted for brevity and clarity so as not to obscure the description of the present disclosure with unnecessary detail. Thus, the present disclosure is not limited to the exemplary embodiments which will be described below, but may be implemented in other forms. In the drawings, the width, length, thickness, etc. of components may be exaggerated or reduced for the sake of convenience. Furthermore, throughout the descriptions, the same reference numerals will be assigned to the same elements in the explanations of the figures, and explanations that duplicate one another will be omitted.

Accordingly, the meaning of specific terms or words used in the specification and claims should not be limited to the literal or commonly employed sense, but should be construed or may be different in accordance with the intention of a user or an operator and customary usages. Therefore, the definition of the specific terms or words should be based on the contents across the specification. The terms "a" and "an" herein do not denote a limitation of quantity, but rather denote the presence of at least one of the referenced item.

As may be used herein, the terms "substantially" and "approximately" provide an industry-accepted tolerance for its corresponding term and/or relativity between items. Such an industry-accepted tolerance ranges from less than one percent to ten percent and corresponds to, but is not limited to, component values, angles, et cetera.

Now, a stator of EPS motor according to a first exemplary embodiment of the present disclosure will be described in detail with reference to FIGS. 1, 2 and 3.

Figure 2:
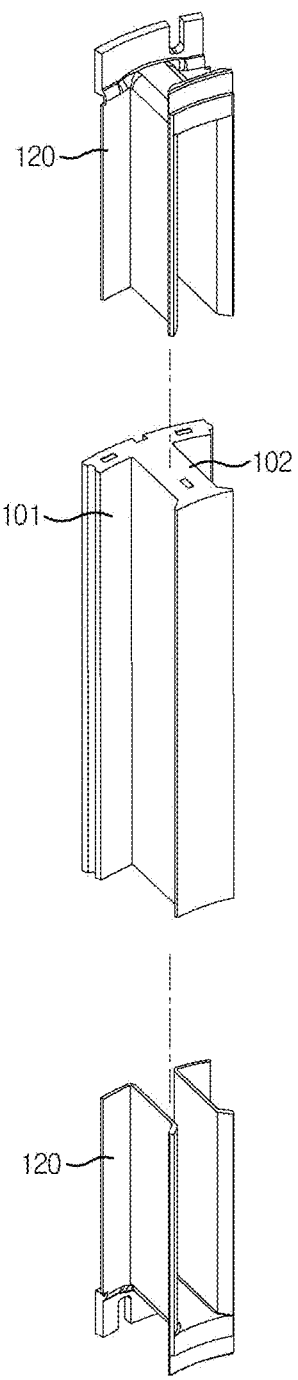
FIG. 2 is an exploded perspective view of a split core and an insulator, essential parts of FIG. 1, according to a first exemplary embodiment of the present disclosure.
Figure 3:
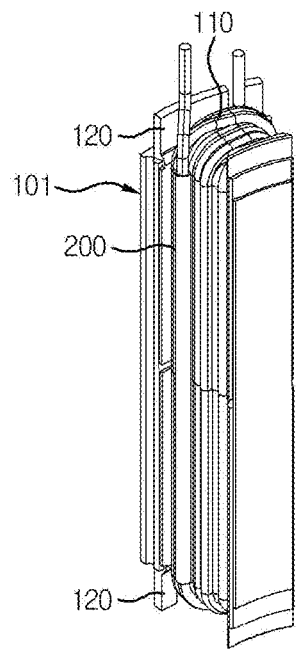
FIG. 3 is a schematic view illustrating a state in which a coil inserted by an insulation tube, which is an essential part of FIG. 1, is wound on a split core according to the present disclosure.

FIG. 1 is a schematic perspective view of a stator core according to an exemplary embodiment of the present disclosure, FIG. 2 is an exploded perspective view of a split core and an insulator, essential parts of FIG. 1, according to a first exemplary embodiment of the present disclosure, and FIG. 3 is a schematic view illustrating a state in which a coil inserted by an insulation tube, which is an essential part of FIG. 1, is wound on a split core according to the present disclosure.

Generally, a stator core (100) configured as shown in FIG. 1 includes a plurality of split cores (101) illustrated in FIG. 2, where the plurality of split cores (101) includes teeth (102) protrusively formed toward a center of the stator core (100). The teeth (102) are tightly wound by a coil (110). The split cores (101) wound by the coil (110) are assembled to a circumferential direction to form a cylindrical stator core (100) as shown in FIG. 1.

Meanwhile, upper and bottom sides of the split cores (101) are insertedly coupled by an insulator (120) for insulation, where a shape of the insulator (120) preferably corresponds to a cross-section of each split core (101). FIG. 2 is an exploded perspective view illustrating a state in which the insulator (120) is inserted into upper and bottom sides of the split cores (101), and FIG. 3 is a schematic view illustrating a state in which the coil (110) is wound on the split core (101) coupled with the insulator (120) according to the present disclosure.

The insulator (120) is formed with a synthetic resin material excellent in insulation property and is preferably injection-molded using a mold. The insulators (120) are respectively inserted into the upper and bottom sides of the split cores (101) forming the stator core (100) to completely encompass the teeth (102) of the split cores (101). Thus, the coil (110) can be wound while the teeth (102) of the split core (101) and the insulator (120) are divided. At this time, the insulators (120) respectively assembled to the upper and bottom sides are vertically symmetric.

An insulation tube (200) is insertedly coupled to the coil (110), and provided in a pipe shape having a diameter corresponding to the coil (110). The insulation tube (200) is provided with an insulating synthetic resin material used for wire coating, and the insulating synthetic resin material is preferably resistant to high temperature.

According to the exemplary embodiment of the present disclosure, a length of the insulation tube (200) is shorter than that of the stator core (100). In a case the length of the insulation tube (200) is too long, chances are a connection section with a coil terminal (not shown) of the coil (110) is insulated. Thus, the length of the insulation tube (200) preferably corresponds to a length of a surface faced by adjacent coils (110).

Figure 4:
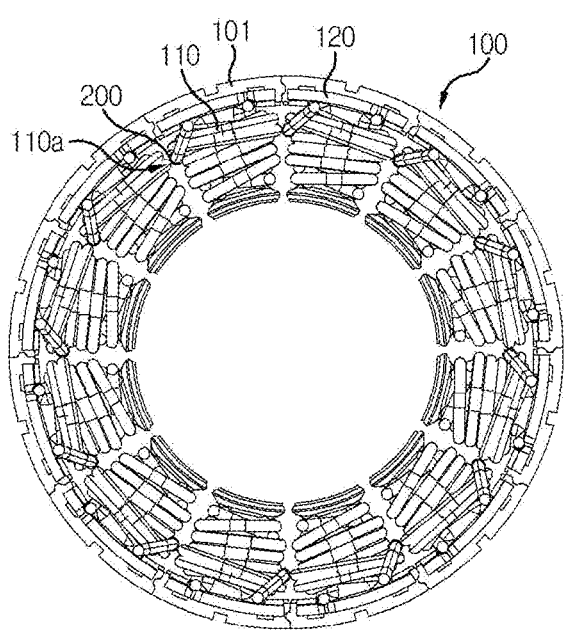
FIG. 4 is a plan view of FIG. 1.

The insulation tube (200) is not inserted into an entire area of wound coil (110), but inserted to one strand of the outmost coil (110) of the wound coil (110), as shown in FIGS. 3 and 4.

That is, as illustrated in FIG. 4, the coil (110) wound on the split core (101) is such that distances to coils (110) wound on the adjacent split cores (101) are not same, where the distance is narrow at some sections and distances are wide at some sections. Thus, in view of the fact that interference between the wound coils (110) is caused by a narrow distance in the coils (110), a problem caused by short-circuit in the coils (110) can be inhibited if the coils (110) wound thereon are insulated.

Meanwhile, thickness of the insulation tube (200) is smaller than a distance of facing surfaces in the plurality of coils (110), whereby the coils (110) wound on the adjacent split cores (101) are inhibited from being excessively too close with the insulation tube (200) when the split cores (101) are assembled. This is because if the thickness of the insulation tube (200) is greater than a gap between the coils (110), there may be generated an interference with a coil (110a, see FIG. 4) wound nearest to the coil (110) inserted into the insulation tube (200) to make it difficult to assemble the stator core (100), in a case the split core (101) wound with the coil (110) is assembled.

Furthermore, as shown in FIG. 4, the insulation tube (200) is provided to rule out any interference with the nearest coil (110a) wound on the adjacent split core (101), and in case of each coil (110) wound on each tooth (102), only one insulation tube (200) is inserted into the coil (110). For example, in case of stator core (100) formed by coupling of a total of 12 split cores, the number of teeth of the coils (110) wound on the teeth of the split core (101) is 12. At this time, a total of 12 insulation tubes (200) are preferably provided to be inserted into the outmost one coil of respective coils (110).

According to the present disclosure thus described, in view of the fact that coils (110) wound inside the stator core (100) are insulated by adjacent coils (110) and the insulation tube (200) to inhibit generation of short-circuit caused by contact between the coils (110), such that it is possible to reduce the management cost through reduced management level of winding process over that of the prior art.

Now, a second exemplary embodiment of the present disclosure will be described with reference to FIGS. 5 and 6.

Figure 5:
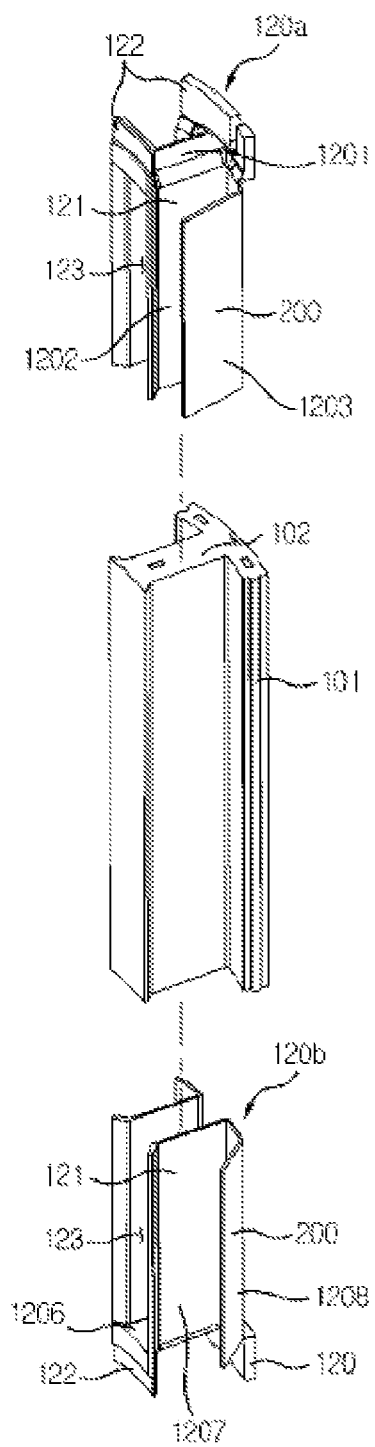
FIG. 5 is an exploded view illustrating a split core and an insulator, which are essential parts of FIG. 1 according to a second exemplary embodiment of the present disclosure.
Figure 6:
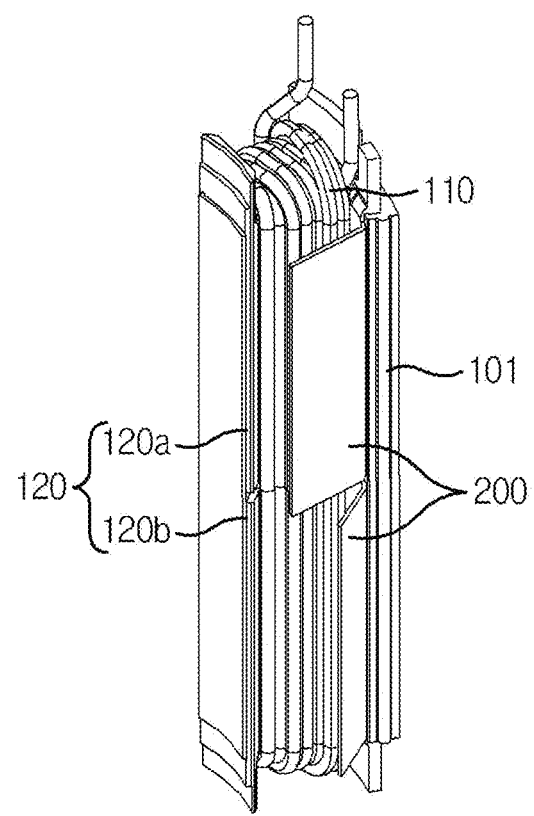
FIG. 6 is a schematic view illustrating a state in which a coil is wound on an insulator integrally formed with an insulation plate, which is an essential part of FIG. 5, according to the present disclosure.

FIG. 5 is an exploded view illustrating a split core and an insulator, which are essential parts of FIG. 1 according to a second exemplary embodiment of the present disclosure, FIG. 6 is a schematic view illustrating a state in which a coil is wound on an insulator integrally formed with an insulation plate, which is an essential part of FIG. 5, according to the present disclosure.

Generally, a stator core (100) includes therein a plurality of teeth, where the plurality of teeth (not shown) is protrusively formed toward a center of the stator core (100). Each tooth is tightly wound by a coil (110). In order to wind the coils (110), the state core (100) includes a plurality of split cores (101) (see FIG. 5), and the split cores are assembled with coils being wound to form a cylindrical stator core (100).

Meanwhile, upper and bottom sides of the split cores (101) are insertedly coupled by the insulator (120) for insulation. FIG. 5 is an exploded perspective view illustrating a state where the insulator (120) is inserted into the upper and bottom sides of the split core (101), and FIG. 6 is a schematic view illustrating a state where the split core (101) is wound by the coil (110).

The insulator (120) is formed with upper and bottom insulators (120a, 120b), where the upper and bottom insulators (120a, 120b) preferably take a vertical symmetrical shape to encompass the teeth and an inner circumferential surface of the split core (101) from upper and bottom sides. The upper and bottom insulators (120a, 120b) include an insulator body (121) and a guide plate (122).

The stator core (101) including a first spilt core and a second spilt core adjacently disposed to the first spilt core. The upper insulator (120a) includes an upper base portion (1201) disposed on an upper surface of the tooth (102) of the first spilt core, and an upper expansion portion (1202) extensively formed from the upper base portion (1201) towards a center portion of the tooth (102) of the first spilt core and disposed on a lateral surface of the tooth (102) of the first spilt core. The bottom insulator (120b) includes a bottom base portion (1206) disposed on a bottom surface of the tooth (102) of the first spilt core, and a bottom expansion portion (1207) extensively formed from the bottom base portion (1206) towards the center portion of the tooth (102) of the first spilt core and disposed on a lateral surface of the tooth (102) of the first spilt core. An upper insulation plate (1203) is extensively formed from one side end portion of the upper expansion portion (1202), and a bottom insulation plate (1208) is extensively formed from the bottom expansion portion (1207).

The insulator body (121) is provided to encompass the teeth and an inner circumferential surface of the split core (101) and is also provided with an insulating resin material. As illustrated in FIG. 5, the insulator body (121) is preferably formed therein with a tooth groove (123) encompassing the teeth. A length of the insulator body (121) is preferably half the length of the split core (101). A periphery of the insulator body (121) thus configured is wound by the coil (110) as shown in FIG. 6.

The guide plate (122) is preferably protruded from the insulator body (121) at a predetermined height to inhibit the coil wound on the insulator body (121) from being disengaged. Meanwhile, a surface opposite to the wound coil (110), which is a lateral surface of the insulator (120), is formed with an insulation plate (200) extended from a lateral surface of the insulator body (121).

Generally, the insulator (120) is formed with a synthetic resin material excellent in insulation property, and the insulation plate (200) is preferably formed with the same material as that of the insulator (120). To this end, the insulator (120) and the insulation plate (200) are preferably injection-molded at the same time using a mold.

Referring to FIGS. 5 and 6, the insulation plate (200) is provided at a lateral wall surface of the insulator (120) in a plate shape having a predetermined area to face a lateral exposed surface of the coil (110) wound on the stator core (100). Thus, a surface arranged with the insulation plate (200) is not exposed with the coil (110).

According to the second exemplary embodiment of the present disclosure, a length of the insulation plate (200) is shorter than a length of the insulator body (121) forming the insulator (120). This is because the insulator (120) formed with the insulation plate (200) is divisively coupled to upper and bottom sides of the split core (101) forming the stator core (100). Preferably, the insulation plate (200) is provided to occupy an approximate half of the length of the coil (110).

Furthermore, as illustrated in FIGS. 5 and 6, the insulation plate (200) is provided to correspond to a width of the coil (110) wound on the stator core (100) to cover a gap between each facing surface of the plurality of wound coils (110).

Preferably, the insulation plate (200) is formed only at one lateral surface of the insulator (120). This is because in case of the stator core (100) formed by coupling of the split cores (101), if the insulation plate (200) is formed only at one side, insulation can be provided by the insulation plate (200) provided at the adjacent split core (101) side even if the coil (110) wound on the split core (101) arranged at an opposite position is exposed.

Meanwhile, the insulation plate (200) may be formed with a little thinner at a connection area to rotate at a predetermined angle relative to the insulator (120), or may be formed with a groove.

According to the abovementioned configuration, a winding process of the coil (110) can be maximally and easily performed by unfolding the insulation plate (200) to the maximum during winding of the coil (110), and in a case the winding process of the coil (110) is finished, the insulation plate (200) can be closed to cover the wound coil (110).

Meanwhile, thickness of the insulation plate (200) is smaller than a distance of opposite surfaces in the plurality of wound coils to inhibit the coils (110) wound on the adjacent split coils (101) from interfering with the insulation plate (200) when the split cores (101) are assembled. In a case the thickness of the insulation plate (200) is thicker than the gap between the coils (110), the assembly process of the stator core (100) may become difficult due to interference with the coils (101).

Furthermore, the insulation plate (200) is intended to rule out interference of all the adjacent coils (110) and is preferably provided in the number corresponding to the number of wound coils (110). For example, in case of the stator core (100) formed by coupling of a total of 12 split cores, the number of coils (110) wound on the teeth of the split cores is 12. At this time, a total of 12 insulation plates may be provided to be inserted into an entire space in respective coils.

According to the present disclosure thus configured, the coils (110) wound inside the stator core (100) is insulated from the adjacent coils (110) by the insulation plate (200) to inhibit generation of short-circuit caused by contact among coils (110), whereby it is possible to reduce the management cost through reduced management level of winding process over that of the prior art.

Figure 7:
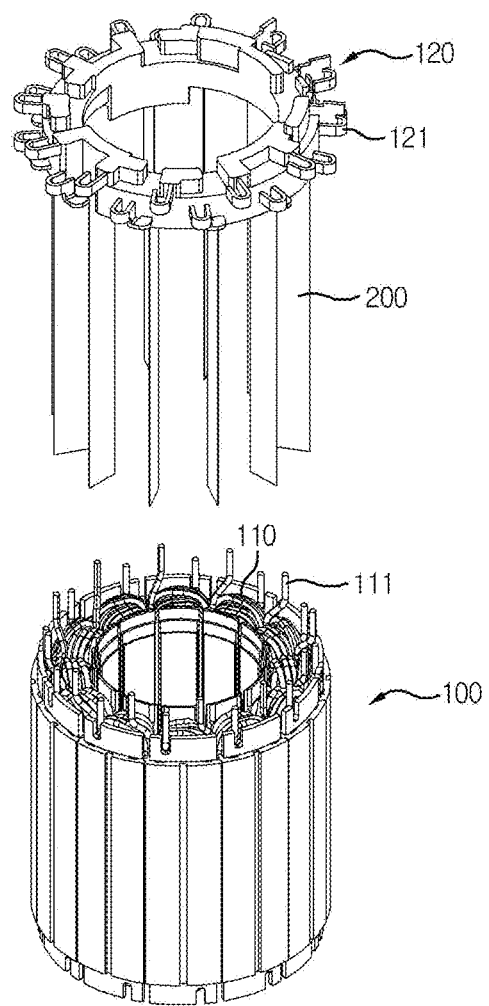
FIG. 7 is an exploded perspective view of an insulation plate and a stator core according to a third exemplary embodiment of the present disclosure.
Figure 8:
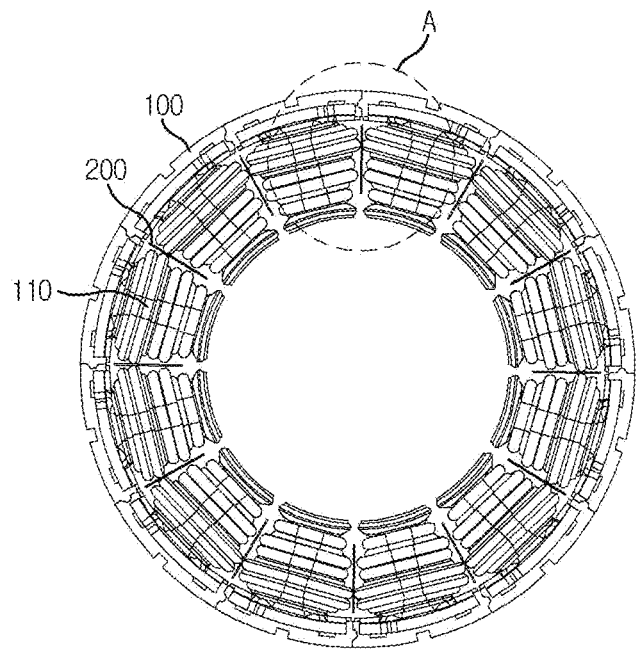
FIG. 8 is a schematic view illustrating an assembled state of the insulation plate and the stator core of FIG. 7.
Figure 9:
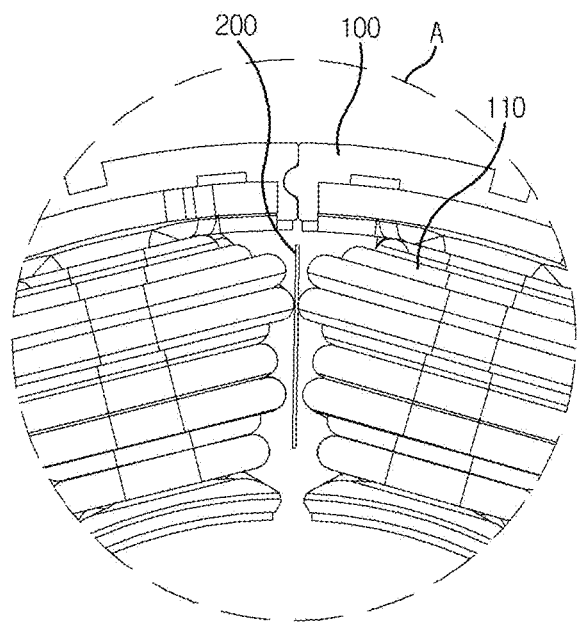
FIG. 9 is an enlarged view of 'A' part of FIG. 8.

FIGS. 7, 8 and 9 illustrate a stator of an EPS motor according to a third exemplary embodiment of the present disclosure.

That is, the stator core (100) includes therein a plurality of teeth (not shown), where the plurality of teeth is protrusively formed toward a center of the stator core (100). Each tooth is tightly wound by a coil (110). In order to wind the coils (110), the state core (100) includes a plurality of split cores, and the split cores are assembled with coils being wound to form a cylindrical stator core (100).

Meanwhile, FIG. 7 illustrates a process in which the insulation plate (200) is inserted into the stator core (100) wound with the coils. The insulation plate (200) is formed with an insulating material and is integrally formed with the bus bar (120) coupled to an upper side of the stator core (100).

The bus bar (120) serves to provide an electric power to each of the coils (110) wound on the stator core (100) and is provided in an approximately ring shape. The bus bar (120) is protrusively formed to a circumferential direction with a terminal (121) conductibly connected to coil terminals (111) each provided at a distal end of the coil (110).

As illustrated in FIG. 7, the insulation plate (200) is provided on a floor surface of the bus bar (120) in a plate shape having a predetermined length and is protrusively formed at a predetermined length toward the floor surface coupled by the stator core (100). Furthermore, the insulation plate (200) is preferably formed with the same resin material as that of the bus bar (120). To this end, the insulation plate (200) and the bus bar (120) are preferably injection-molded at the same time using a mold during mold-forming of the bus bar (120).

According to the exemplary embodiment of the present disclosure, a length of the insulation plate (200) preferably corresponds to a length of the stator core (100), and is at least longer than a length of the wound coil (110), but should not exceed the length of the stator core (100).

Referring to FIGS. 8 and 9, the insulation plate (200) is provided to correspond to a width of the coil (110) wound on the stator core (100), and inserted into a space formed between surfaces each facing the plurality of wound coils (110).

Meanwhile, as shown in FIG. 7, the insulation plate (200) is inserted into the stator core (100) completed in coupling by all the coils (110) being wound, and in a case a thickness of the insulation plate (200) is thicker than a gap between the coils (110), the insertion process may be difficult due to interference among the coils (110). Thus, the thickness of the insulation plate (200) is smaller than a distance of facing surfaces among the plurality of wound coils (110), whereby the insertion of the insulation plate (200) to the wound coils (110) is not interfered during insertion of the insulation plate (200).

Meanwhile, the insulation plate (200) functions to inhibit interference among all the adjacent coils (110) and is preferably provided in the number corresponding to the number of wound coils (110). For example, in case of the stator core (100) formed by coupling of a total of 12 split cores, the number of coils (110) wound on the teeth of the split cores is 12. At this time, a total of 12 insulation plates may be provided to be inserted into an entire space in respective coils.

According to the present disclosure thus configured, the coils (110) wound inside the stator core (100) is insulated from the adjacent coils (110) by the insulation plate (200) to inhibit generation of short-circuit caused by contact among coils (110), whereby it is possible to reduce the management cost through reduced management level of winding process over that of the prior art.

Figure 10:
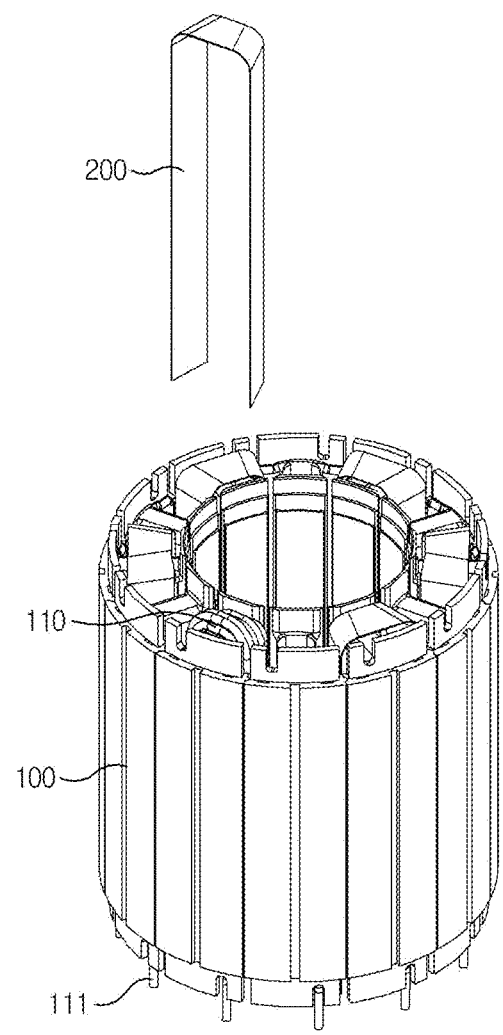
FIG. 10 is an exploded perspective view of an insulation paper and a stator core according to a fourth exemplary embodiment of the present disclosure.
Figure 11:
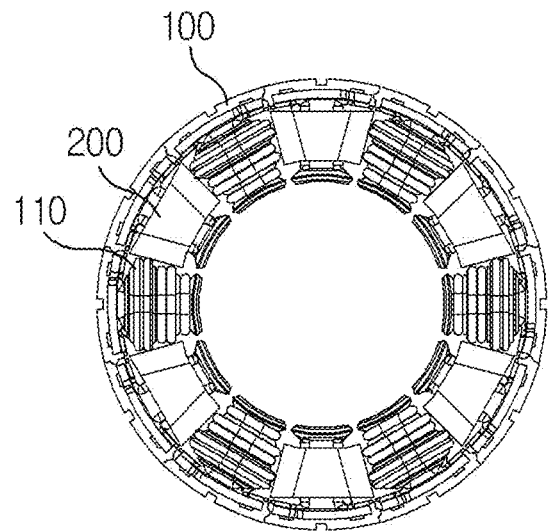
FIGS. 11 and 12 are schematic view illustrating an assembled state of the insulation paper and the stator core of FIG. 10.
Figure 12:
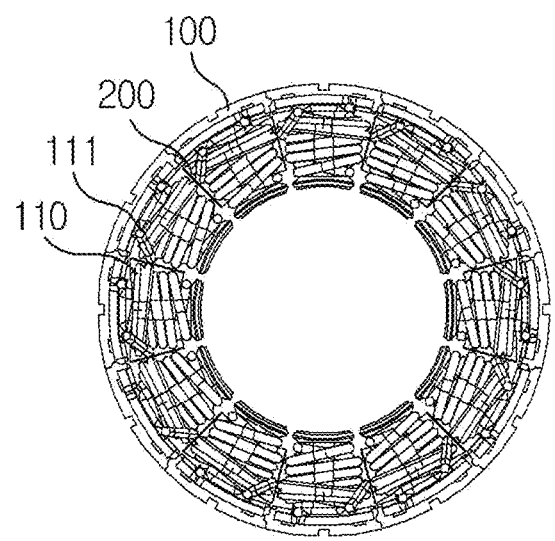
Figure 13:
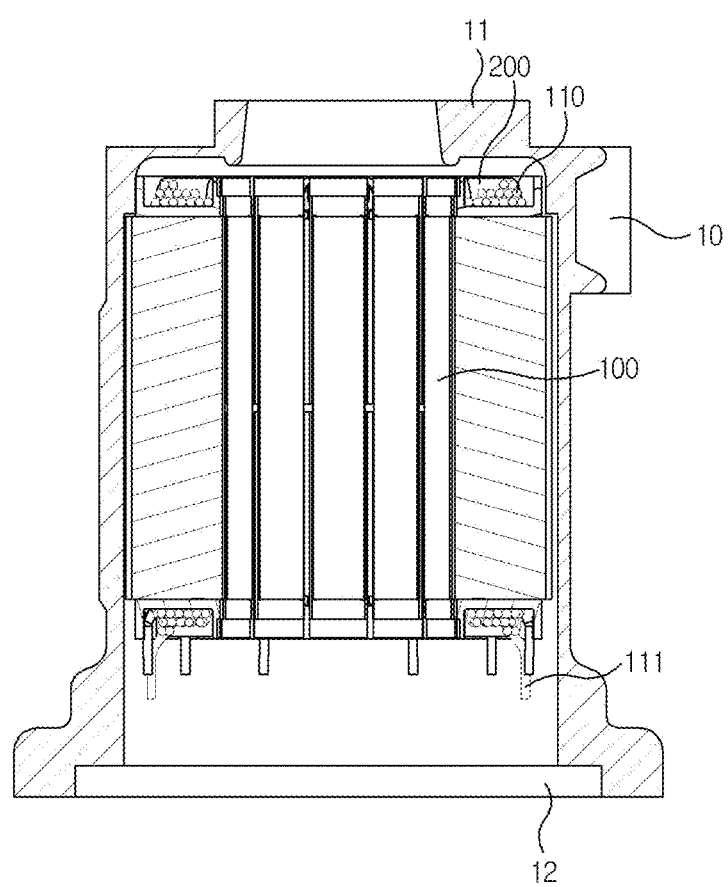
FIG. 13 is a cross-sectional view illustrating a coupled state of a stator to a motor housing according to an exemplary embodiment of the present disclosure.

FIG. 10 is an exploded perspective view of an insulation paper and a stator core according to a fourth exemplary embodiment of the present disclosure, FIGS. 11 and 12 are schematic view illustrating an assembled state of the insulation paper and the stator core of FIG. 10, and FIG. 13 is a cross-sectional view illustrating a coupled state of a stator to a motor housing according to an exemplary embodiment of the present disclosure.

Generally, a stator core (100) includes therein a plurality of teeth, where the plurality of teeth (not shown) is protrusively formed toward a center of the stator core (100). Each tooth is tightly wound by a coil (110). In order to wind the coils (110), the state core (100) includes a plurality of split cores (101), and the split cores are assembled with coils being wound to form a cylindrical stator core (100).

FIG. 10 is a schematic view illustrating a procss where an insulation paper (200) is inserted into the stator core (100) wound with coils. As illustrated in FIG. 10, the insulation paper (200) used as an electrical insulation material free from conductivity is manufactured by using a method in which a synthetic resin having an insulation substance is included in fiber particles of paper, and a physical property of the insulation paper (200) is of no big difference from the general paper but is formed with a material excellent in insulation.

The insulation paper (200) is preferably bent in an approximate shape of a ' ⊏ ', and a floor surface of the insulation paper (200) is arranged on a floor surface of the stator core (100). That is, as shown in FIGS. 11 and 12, the floor surface of the stator core (100) is arranged on the floor surface of the insulation paper (200) to alternatively expose the coil (110), while an upper surface of the stator core (100) protrusively formed by the coil terminals (111) connected to the coil (110) exposes all the wound coils.

According to the coupling relation thus configured, as shown in FIG. 13, the floor surface of the bent insulation paper (200) is brought into a tight and close contact with a floor surface (11) of the motor housing (10) when the closed floor surface (11) of the motor housing (10) is insertedly coupled by the floor surface of the stator core (100). Then, the insulation paper (200) is never disengaged, even if no separate disengagement inhibition device is provided, unless the insulation paper (200) be forcibly pulled out through an opening (12) of the motor housing (10).

Meanwhile, as shown in FIG. 10, the insulation paper (200) may be inserted into the stator core (100) completed in coupling by all the coils (110) being wound, but, in this case, the insertion process of the insulation paper (200) may not be easy due to interference among the adjacent coils (110). Thus, a process of winding the insulation paper (200) may be pre-performed in the processes of winding the coils (110) on the split cores to allow the insulation paper (200) to encompass a periphery of the coil (110), and the split cores may be assembled to form the stator core (100).

Furthermore, according to the exemplary embodiment of the present disclosure, although the insulation paper (200) may be so arranged as to encompass the periphery of all the coils (110), but in consideration of the fact that an object of the insulation paper (200) is to inhibit interference of the adjacent coils (110), there is no need of an arrangement in which the insulation paper (200) encompasses the periphery of all the coils (110).

That is, as shown in FIGS. 11 and 12, in a case the insulation paper (200) is inserted into one coil (110) to encompass the periphery of the coil (110), there is no need of inserted arrangement of the insulation paper (200) on the coils (110) arranged at a vicinity of the coil (110) encompassing the periphery by the insulation paper (200).

For example, in case of the stator core (100) formed by coupling of a total of 12 split cores, the number of coils (110) wound on the teeth of the split core is 12. At this time, a total of six insulation paper (200) can be arranged. FIGS. 11 and 12 are schematic views illustrating an arrangement state in which a coil (110) wrapped by the insulation paper (200) and a coil (110) not wrapped by the insulation paper (200) are alternatively arranged.

As apparent from the foregoing, the stator of EPS motor has an industrial applicability in that the coils (110) wound inside the stator core (100) is insulated from the adjacent coils (110) by the insulation paper (200) to inhibit generation of short-circuit caused by contact among coils (110), whereby it is possible to reduce the management cost through reduced management level of winding process over that of the prior art.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims.

What is claimed is:

1. A stator of an EPS motor, the stator comprising:
a stator core including a first spilt core and a second spilt core adjacently disposed to the first spilt core;
a coil unit including a first coil wound on a tooth of the first spilt core and a second coil wound on a tooth of the second spilt core;
an insulator coupled to the stator core to insulate the coil unit from the stator core; and
an insulation plate extensively formed from the insulator and disposed between the first coil of the coil unit and the second coil to inhibit the first coil from coming into contact with the second coil and causing a short circuit;
wherein the insulator comprises an upper insulator and a lower insulator;
wherein the upper insulator includes an upper base portion disposed on an upper surface of the tooth of the first spilt core, and an upper expansion portion extensively formed from the upper base portion towards a center portion of the tooth of the first spilt core and disposed on a lateral surface of the tooth of the first spilt core;
wherein the bottom insulator includes a bottom base portion disposed on a bottom surface of the tooth of the first spilt core, and a bottom expansion portion extensively formed from the bottom base portion towards the center portion of the tooth of the first spilt core and disposed on a lateral surface of the tooth of the first spilt core;
wherein the insulation plate includes an upper insulation plate extensively formed from the upper expansion portion, and a bottom insulation plate extensively formed from the bottom expansion portion;
wherein a first end of the insulation plate is rotatable formed at one side distal end of a first side lateral wall of the insulator, and a second end opposite to the first end of the insulation plate is formed as a free end;
wherein a width from the first end of the insulation plate to the second end of the insulation plate corresponds to a distance between the one side distal end of the first side lateral wall of the insulator and the other side distal end of the first side lateral wall of the insulator;
wherein the insulation plate has a fixed thickness from the first end to second end; and
wherein the insulation late is not symmetric about an imaginary line connecting a center of the EPS motor and a center of the insulator.

2. The stator of claim 1, wherein the insulation plate has a thickness smaller than a gap between the first coil and the second coil.

3. The stator of claim 1, wherein the upper base portion, the upper expansion portion, and the upper insulation plate are integrally formed.

4. The stator of claim 1, wherein the insulation plate is rotatably formed at a lateral wall of each of the upper expansion portion and the bottom expansion portion.

5. The stator of claim 1, wherein the upper insulator and the bottom insulator are provided in a symmetrical shape.

6. The stator of claim 1, wherein a length of each of the upper expansion portion and the bottom expansion portion is half a length of the tooth of the first spilt core.

7. The stator of claim 6, wherein the insulation plate has a length corresponding to a length of each of the upper expansion portion and the bottom expansion portion.

8. The stator of claim 1, wherein the insulator further comprises a second side lateral wall opposite to the first side lateral wall in a circumferential direction, and
wherein the insulation plate is disposed at the first side lateral wall of the insulator, and the insulation plate is not disposed at the second side lateral wall of the insulator.

* * * * *